United States Patent
Gerber et al.

[11] 3,931,919
[45] Jan. 13, 1976

[54] BICYCLE CARRIER FOR AUTOMOBILES

[76] Inventors: Gary A. Gerber, 15 White Birch Ridge, Weston, Conn. 06880; Kenneth R. Benson, 80 University Ave., Bridgeport, Conn. 06604

[22] Filed: Mar. 12, 1974

[21] Appl. No.: 450,363

[52] U.S. Cl. ............ 224/42.1 F; 211/22; 224/29 R; 248/316 C
[51] Int. Cl.² .......................................... B60R 9/10
[58] Field of Search ...... 224/29 R, 42.03 B, 42.1 R, 224/42.1 E, 42.1 F, 42.1 G; 211/17, 18, 22; 248/226 R, 226 B, 226 D, 316 R, 316 C

[56] References Cited
UNITED STATES PATENTS

| | | | |
|---|---|---|---|
| 518,325 | 4/1894 | Mueller | 211/22 |
| 574,629 | 1/1897 | Phillips | 211/17 |
| 625,746 | 5/1899 | Colsten | 211/17 |
| 2,803,349 | 8/1957 | Talbot | 211/22 |
| 3,199,815 | 8/1965 | Martinkovic et al. | 248/226 D X |
| 3,677,451 | 7/1972 | Burland | 224/42.1 F |
| 3,752,375 | 8/1973 | Weigl | 224/42.03 B |

FOREIGN PATENTS OR APPLICATIONS

| | | | |
|---|---|---|---|
| 864,799 | 2/1941 | France | 224/42.03 B |

Primary Examiner—Robert J. Spar
Assistant Examiner—Leslie J. Paperner
Attorney, Agent, or Firm—Sherman Levy

[57] ABSTRACT

A bicycle carrier for automobiles is provided that includes a basic carrier frame, a handle bar clamp assembly, and a seat clamp assembly. There is also provided fastening means for maintaining the parts in their proper assembled position.

7 Claims, 8 Drawing Figures

BICYCLE CARRIER FOR AUTOMOBILES

BACKGROUND OF THE INVENTION

1. Field of the Invention

The present invention relates to bicycle carriers, and more particularly to bicycle carriers for vehicles such as automobiles.

2. Summary of the Invention

A bicycle carrier for automobiles is provided wherein the carrier can be easily installed and removed from the vehicle, and wherein the carrier and bicycles are roof-mounted so as to place the bicycles safely out of way and assure the driver with clear visibility. Also, the carrier of the present invention has an improved capacity as compared to prior devices since it will carry a minimum of four bicycles and a maximum of six bicycles. The device uses an all mechanical securing means for a positive positioning of the bicycles.

The primary object of the present invention is to provide a bicycle carrier for automobiles wherein the carrier and bicycles can be easily installed and removed from the vehicle, and wherein the carrier is adapted to be mounted on the roof of the vehicle so that the bicycles will be out of the way.

Still another object of the present invention is to provide a vehicle bicycle carrier that is ruggedly constructed and efficient to use and which is simple and inexpensive to manufacture.

Other objects and advantages will become apparent in the following specification, when considered in the light of the attached drawings.

DESCRIPTION OF THE PREFERRED EMBODIMENT

Figure 1:
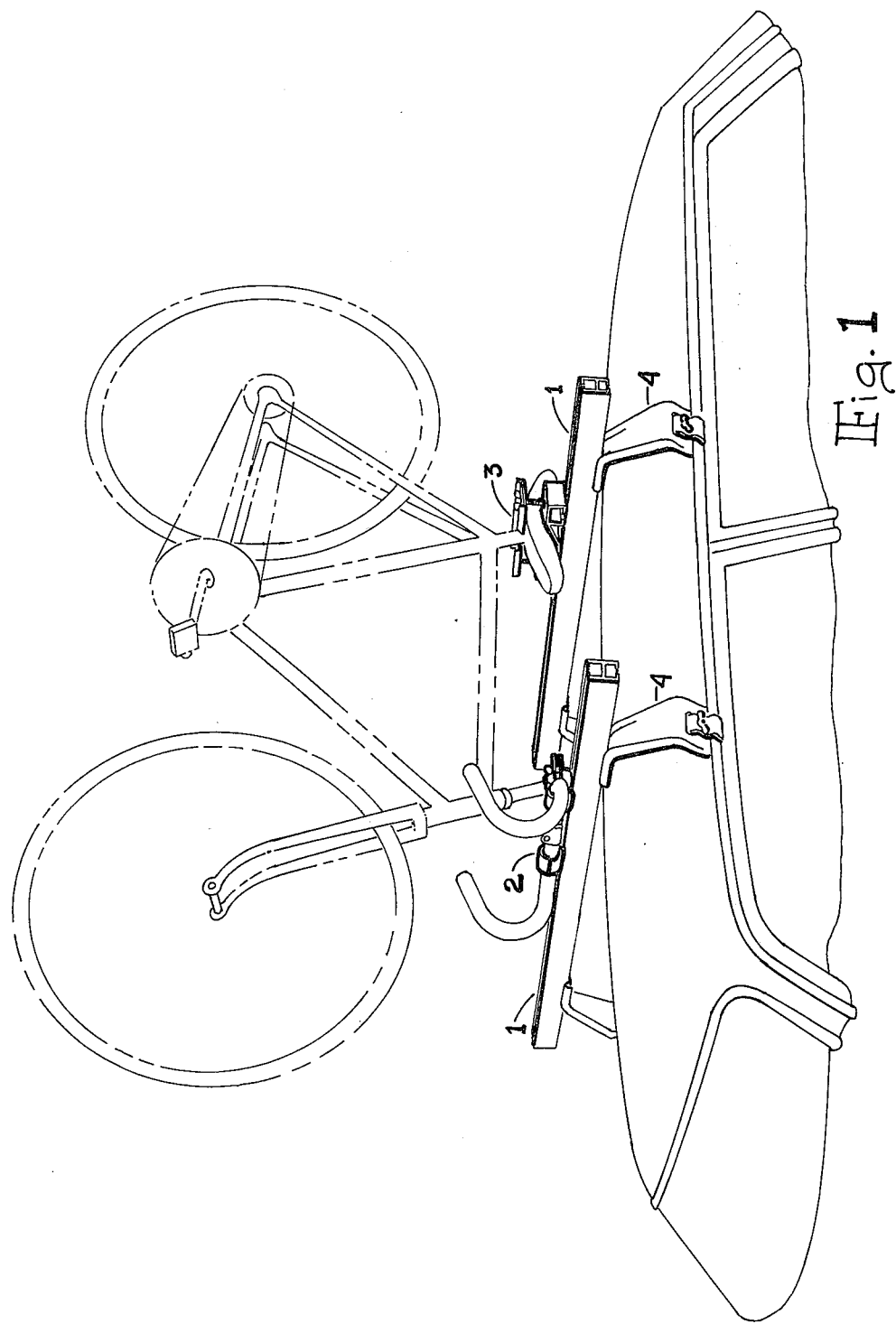
FIG. 1 is a view illustrating the carrier mounted on an automobile roof, and showing a bicycle in broken lines mounted thereon, and for clarity of the illustration only one bicycle is illustrated.
Figure 2:
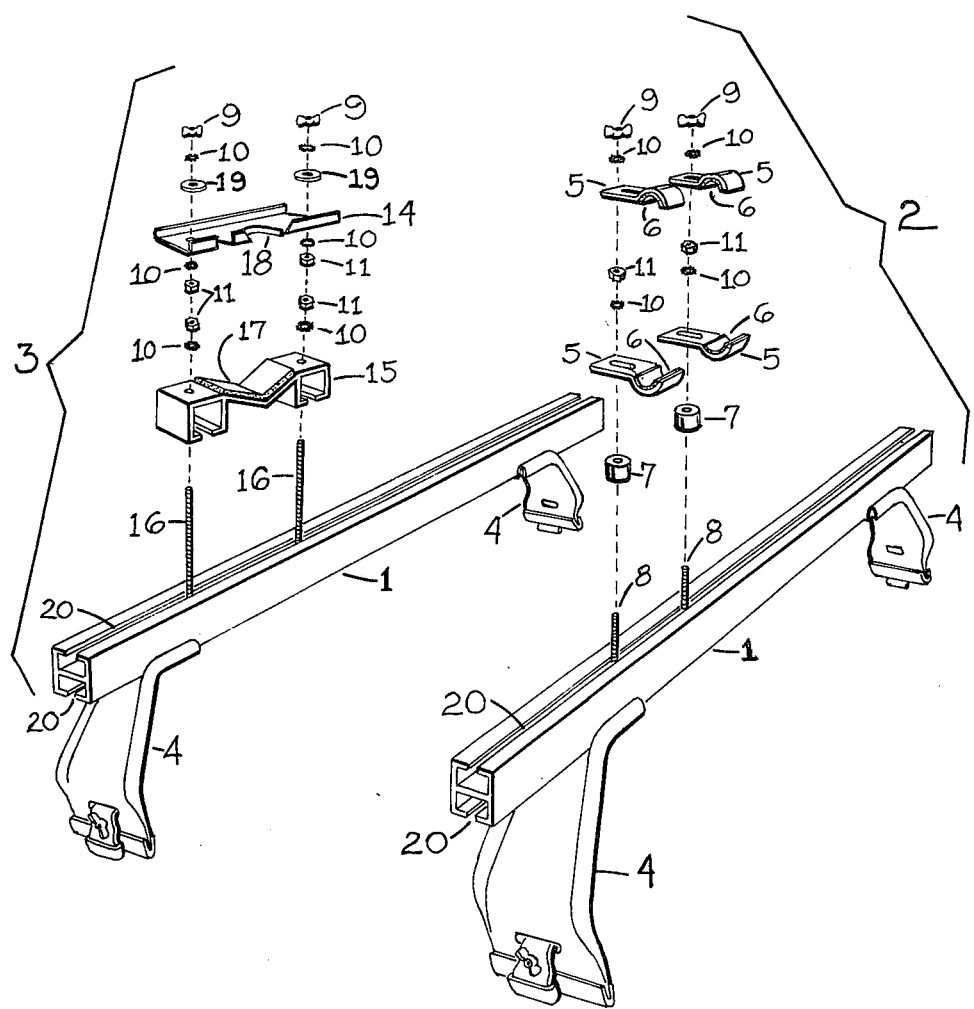
FIG. 2 is an exploded assembly view illustrating certain of the components.

Referring now to the drawings in detail, and more particularly to FIGS. 1–6 of the drawings, as shown in FIG. 1 there is illustrated a carrier mounted on an automobile roof with a bicycle typically mounted thereon. For clarity of illustration, only one bicycle is illustrated, but it is to be understood that the capacity of the carrier is a minimum of four bicycles. Similarly, FIG. 2 illustrates an exploded assembly view of the components for mounting one bicycle.

In accordance with the present invention, there is provided a bicycle carrier for automobiles which is a new and unique method of transporting bicycles on a roof carrier to fit automobiles or other vehicles. Some of the important features of the present invention are as follows:

First, the carrier is constructed so that it can be easily installed and removed from the vehicle. Secondly, it is roof mounted which placed the bicycle safely out of harm's way and provided the driver with clear visibility. Third, improved capacity is assured since it will carry a minimum of four bicycles and a maximum of six. Fourth, this construction uses an all mechanical securing means for a positive positioning of the bicycles. As a result of these mechanical features, there are the added advantages of no loose parts, all the hardware stays on the carrier, there are no extra pieces to misplace, and a custom fit feature for each bicycle. Also, the hardware adjusts for each bicycle to be mounted, and the device will stay set in place.

As shown in the drawings, the carrier comprises three main elements, FIG. 2. Namely, there is a basic carrier frame which consists of two rails 1 that are slotted on two longitudinal faces 20, but not restricted to two faces, and there are provided supporting brackets 4 for mounting to a car roof. There is provided a handle bar clamp assembly 2 that positions and secures the handle bars 13 in place. A seat clamp assembly 3 is provided for locating and securing the rear of the bicycle, and there is also provided fastening hardware.

The installation of the bicycle carrier and the mounting of the bicycles is as follows. The carrier comprises two identical rails 1 that can be made of any suitable material, such as aluminum, and these are mounted to the car's rain gutter in the manner typically used for ski racks, luggage carriers, and the like as indicated by the numeral 4. Suitable hardware is provided for gutterless cars so that where gutterless cars are being used, such suitable or special hardware can be made available.

The bicycles are placed upside down, FIG. 1, facing either forwards or backwards as the space permits, with a set of padded handle bar clamps for securing the front of the bicycle and the rear of the bicycle is located by the seat clamp assembly.

Initially the seat locating hardware is positioned first. The carriage bolts 16 are positioned in the slot 20, and the seat support bracket 15 is fastened in place by the lock washer 10 and the hexnut 11. The bicycle seat, when placed in the seat support bracket 15, will automatically center due to the V configuration of the part.

The seat protector pad 17 serves to cushion and protect the seat. The seat clamp 14 is located on one of the carriage bolts 16 and is swung over the saddle 21 frame 22 so that the open slot 23 will accept the second bolt 16. The flanges 24 serve to strengthen the seat clamp 14, and the flange positioned at the end of the open slot will prevent the clamp 14 from disengaging from the bolt 16 due to the interference caused by the washer 19 from the flange 24 should the wing nut 9 become accidentally loosened.

The method for securing the rear of the bicycle by means of a positive grip on the saddle frame 22 is due to the universality of this saddle frame and mounting post construction for all bicycles. As shown in the drawings, the seat clamp assembly 3, FIG. 2, comprises long carriage bolts or securing elements 16, square washers, seat support brackets 15, seat protector pads 17, lock washers 10, hexnuts 11, seat clamp 14, saddle frame protector pad 18, washers 19, and wing nuts 9.

As shown in the drawings, the front of the bicycle is secured in place by positioning the handle bar clamp assembly in a mean position to permit adjustment of the handle bar clamps 5 forward and backward. The handle bar clamps 5 are free to slide forward and back and swing 360° due to the slot 25 in each handle bar clamp 5 to permit total adjustment to accommodate a variety of handle bar shapes 13. When the bicycle is considered to be positioned, the lower handle bar clamps 5 are secured by means of hexnut 11 and lock washer 10, FIG. 3. This construction facilitates removal of the bicycle from the carrier without disturbing the setting. Each bicycle can have its lower handle bar clamps 5 positioned to suit, providing a custom fit.

Figure 4:
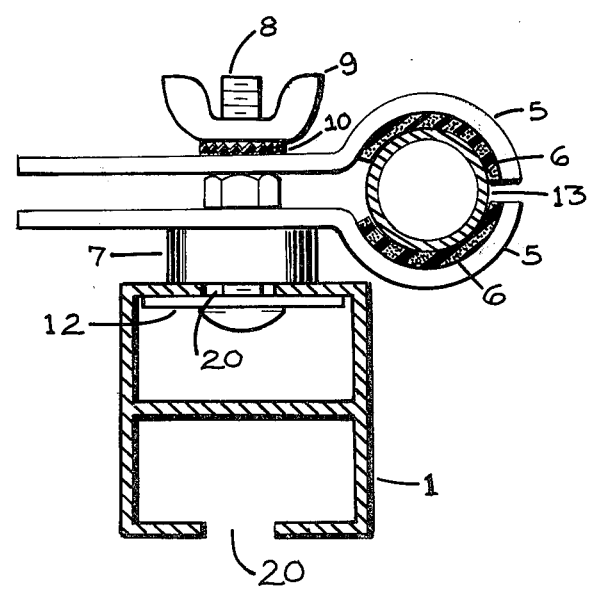
FIG. 4 is a sectional view illustrating the handle bar securing means.
Figure 5:
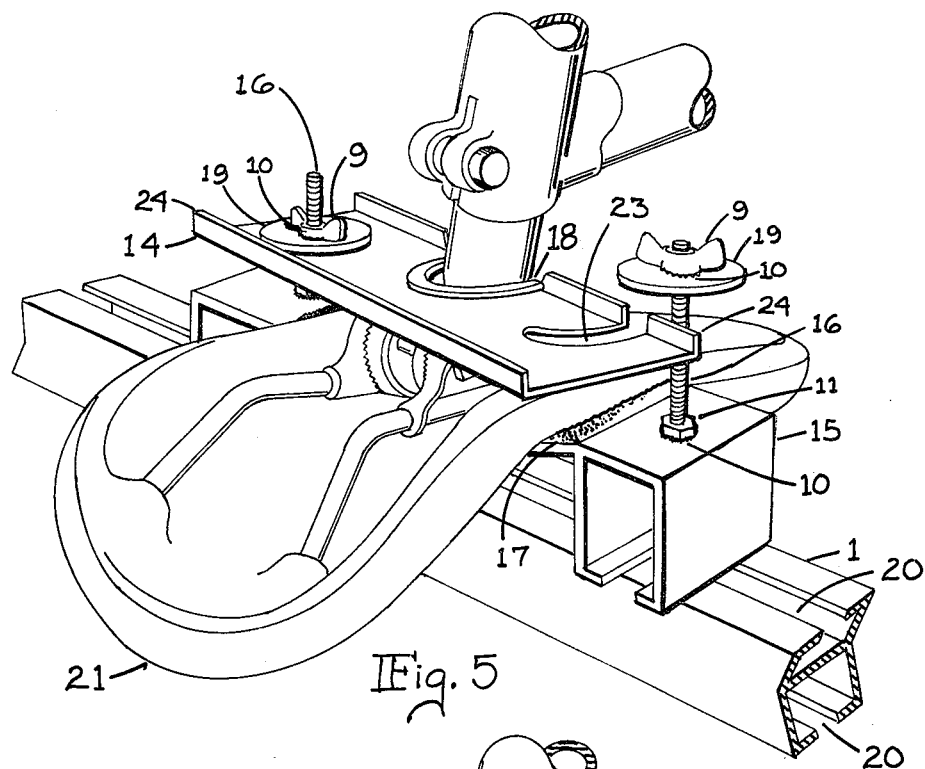
FIG. 5 is a perspective view illustrating the positioning and securing means for the rear portion of the bicycle.
Figure 6:
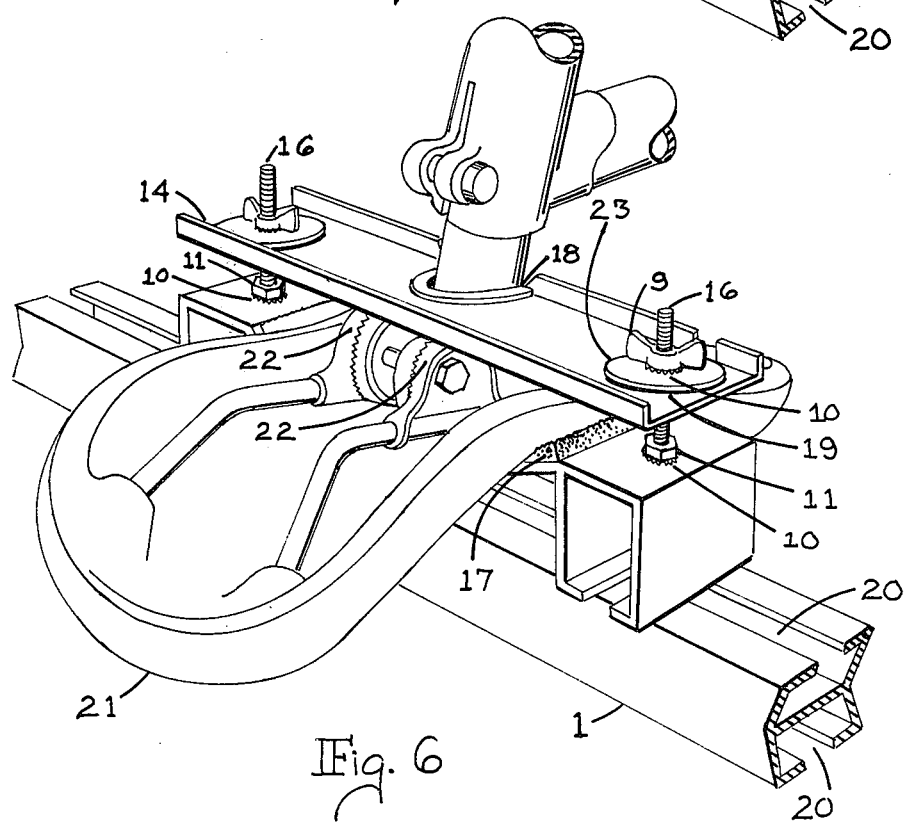
FIG. 6 is a perspective view illustrating the securing means for the rear of the bicycle and showing the parts in a different position from that shown in FIG. 5.

Next, to secure the handle bars in the clamps, the upper handle bar clamps 5 are swung into place and tighened by the wing nuts; FIG. 4 shows the mounting of the bicycle handle bars 13 in a sectional view. In this view the lower handle bar clamp 5 securing lock washer 10 and hexnut 11 have been replaced by a single locking hexnut 26. The spacer 7 is essential to raise the handle bar post yoke clear of the carrier rail 1. The handle bar protective pad 6 cushions and protects the handle bar finish and the like.

Also, both the handle bar clamp assembly 2 and the seat clamp assembly 3 are separate from the rails 1, and thus there is total freedom in the placement and spacing of the bicycles to be carried.

It is known that other bicycle carriers grip the bicycles by the wheels which puts a strain on the wheels and could easily deform the wheels. In the present invention, bicycles are physically separated, whereas in other types of carriers the bicycles are in contact with each other which results in damage to the parts.

Figure 7:
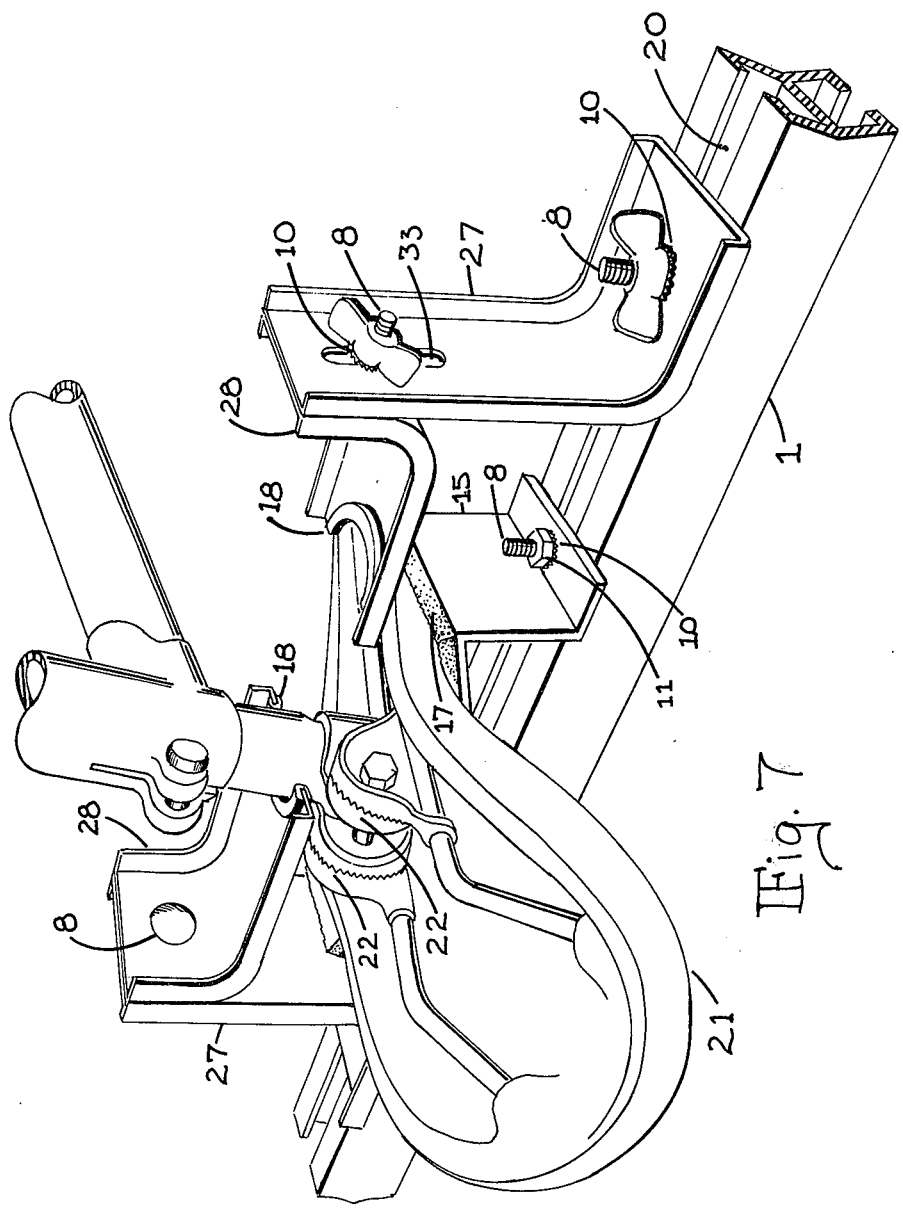
FIG. 7 is a perspective view illustrating a modified or alternative method of securing the rear of the bicycle in place.

Referring to FIG. 7, there is illustrated a modified or alternative construction for securing the rear of the bicycle in place. The principle is the same as that previously described except the parts are shaped differently. Formed metal bracket 27 is slotted as in 33 to permit vertical adjustment of the hold down bracket 28. To release the bicycle, the pressure is relieved from the hold down bracket 28 by loosening the wing nut 8, then the formed metal bracket 27 is moved away by loosening the wing nut 8 and sliding the bracket bolt 8 down the slot 20 in the rail 1.

Figure 8:
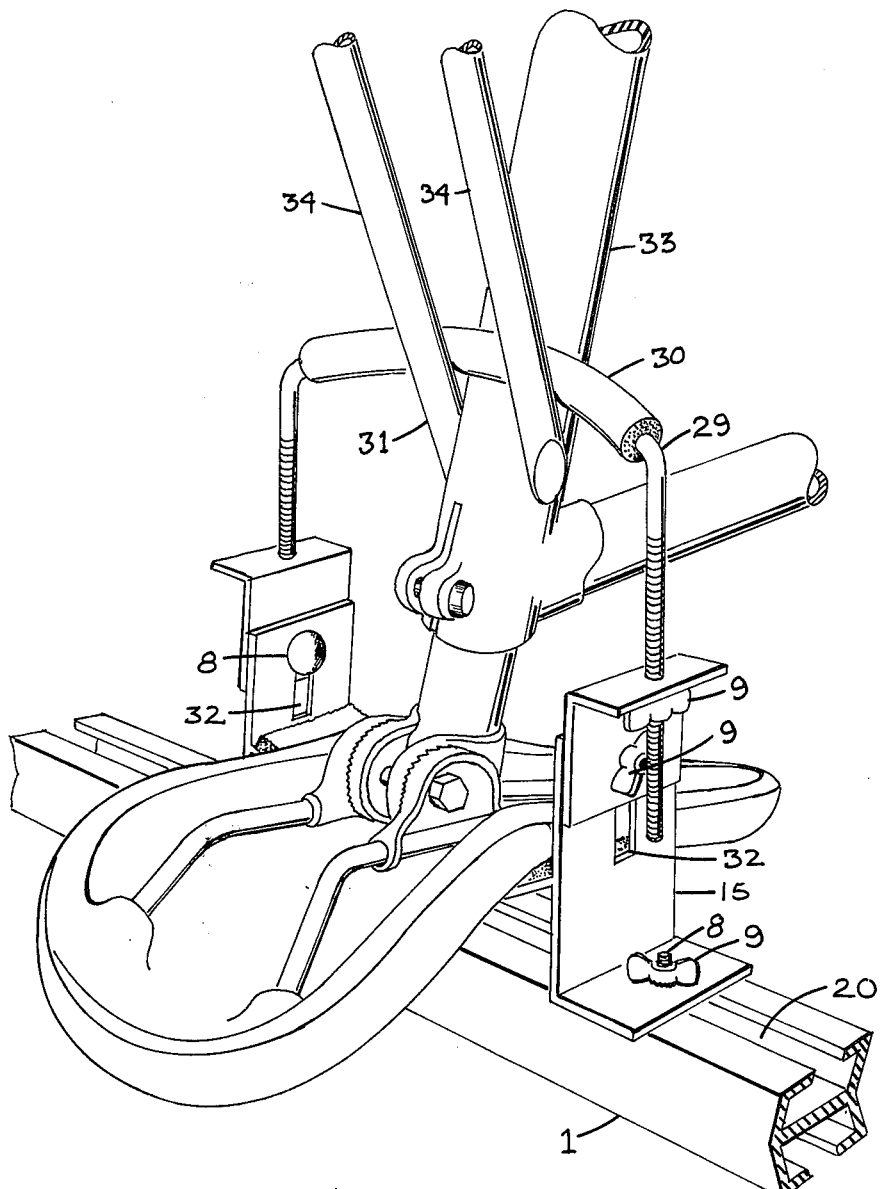
FIG. 8 is a perspective view of a still further modified or alternative method of securing the rear of the bicycle in place.

Referring to FiG. 8 of the drawings, there is illustrated a further alternate or modified method or means for securing the rear of the bicycle mechanically. The protective pad 30 U-bolt 29 engages the bicycle frame between the seat support 33 and the rear wheel support frame 34. Variations in seat height are accommodated by the threaded section of the U-bolt and the slots 32 in the seat support bracket 15.

The parts can be made of any suitable material and in different shapes and sizes.

It will, therefor, be seen that there has been provided a bicycle carrier for automobiles which is an improvement over the prior or existing types of bicycle carriers. Heretofor, bicycle carriers for transporting bicycles have been of three types: (1) A rear bumper mounted rack with a capacity of two to four bicyles. This type of carrier places the bicylces in direct jeopardy with regard to accidents and damage, should the vehicle bottom as in pulling out of a steep driveway. (2) The second method of transporting bicycles is the trunk mounted carrier with a capacity of two to four bicycles. This type may cause the bicycles to damage each other and further it obstructs the rear vision while driving the car. (3) The third type of carrier is the roof rack with a capacity of up to six bicycles.

Also, the present or prior state of the art shows that all bicycle carriers employ web straps and/or elastic straps to secure the bicycles in place. Due to the nature of the materials, the use of web straps and/or elastic straps permits excessive motion of the bicylces while in transit, requiring the user to stop and check the carrier. The strap approach results in an unwieldy array of straps to remove from the carrier and store when bicycles are not being transported. The straps are prone to weaken and wear out and break. This possibility, coupled with the chance of misplacing the loose parts, leaves much to be desired as a bicycle transporter. Also, the variety of accessories that may be fitted to bicycles could force the user to depart from the prescribed mounting format and resort to a random strapping arrangement that results in a haphazard securement at best.

In accordance with the present invention, there is provided a bicycle carrier that is a new and unique method of transporting bicycles on a roof carrier to fit all automobiles and the like. The construction uses an all mechanical securing means for a positive positioning in rack carriers and specifically roof mounted rack carriers for automobiles. The product is especially suitable for, but not restricted to, multi-speed light weight bicycles with a frame size from 21 inches to 25 inches, and comprises three main elements: (1) a basic carrier consisting of two rail racks slotted at least on two longitudinal faces but not restricted to two faces and the support hardware for mounting to a car roof; (2) handle bar clamps including adjustable clamps that position and secure the handle bars; (3) a seat clamp assembly that locates and secures the rear of the bicycle. There is also provided certain standard fastening hardware that can be furnished with the carrier.

When installing the bicycle carrier, the rack consisting of the two identical rails is mounted on the car's rain gutters and the bicycles are placed upside down facing each other forwards or backwards as previously noted. With the bicycles placed upside down facing either forwards or backwards as space permits, with a set of padded handle bar clamps securing the front of the bicycle, with the rear of the bicycle being secured to the rack by a formed plate which engages between the saddle and the bicycle frame. Initially the seat locating hardware and rack are positioned in place first. For clarity, this explanation assumes that all bicycles are mounted facing in the same direction. Next the handle bar hardware rack is located in a mean position to allow adjustment of the handle bar clamps forward and back, and the handle bar clamps are free to slide forward and back and swing 260° to permit total adjustment to accommodate a variety of handle bar shapes. When the bicycle is considered to be positioned, the lower handle bar clamps are secured by means of a hexnut and washer. This facilitates removal of the bicycle from the rack without disturbing the setting. Each bicycle can have its lower handle bar clamps positioned to suit so as to provide a custom fit. Next, to secure the handle bars in the clamps, the upper handle bar clamps are swung into place and tightened by the wing nuts.

It will be seen that the mounting of the bicycle is new and unique in that it engages a plate between the seat post hardware and seat post frame to rigidly secure the bicycle using carriage bolts and wing nuts to the rack. Again the bicycle may be removed from the rear fastening hardware without disturbing the setting. This mounting procedure eliminates the major variables of handle bar height and seat height above the frame. When the rear of the bicycle is to be placed on the rack, the seat clamp is pivoted out of the way, the bicycle is placed on the rack, the seat clamp is swung into position and the wing nuts tightened which automatically applies securing pressure directly on the center of the seat frame hardware.

Further, the method for the securing the rear of the bicycle by means of a positive grip on the saddle frame is possible due to the universal design of the saddle frame and mounting post construction. This virtually makes seats identical for purposes of a standardized mounting technique or arrangement.

With further reference to the handle bar clamp, spacers permit clearance for the handle bar stem above the rack. As to the seat clamp, the center lines of pressure is directly over the seat frame. The seat support is adapted to be provided with a protector pad. And also the handle bar clamp is adapted to have a protector pad. In the event that the wing nut should loosen, the flange 24 on the seat clamp prevents the clamp from disengaging.

Figure 3:
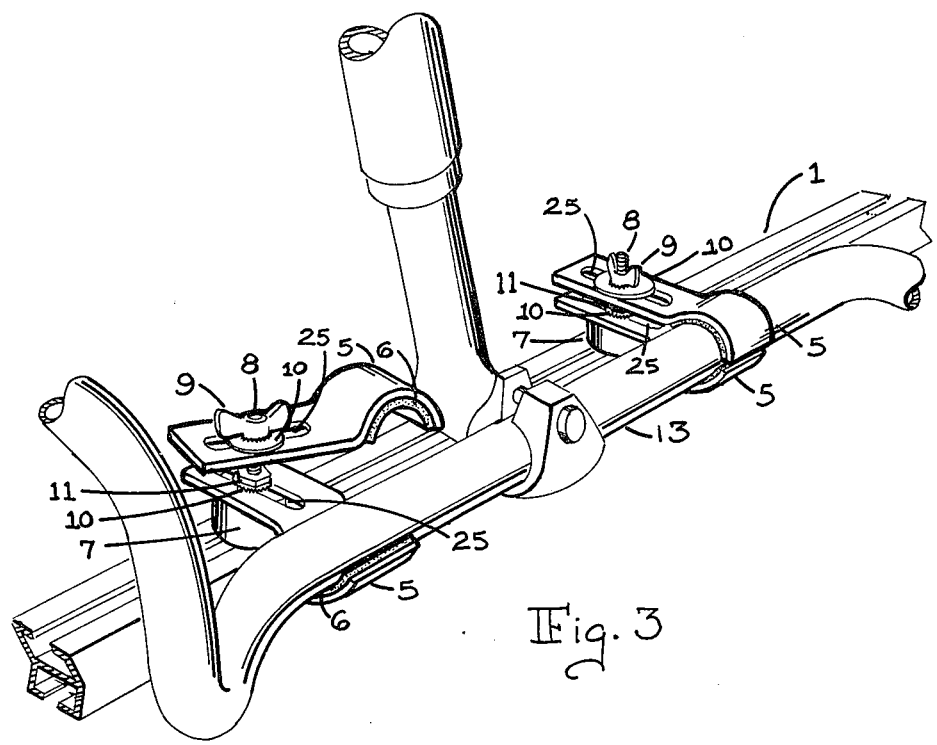
FIG. 3 is a fragmentary perspective view, with parts broken away and in section, showing the positioning and securing means for the handle bars.

FIG. 3 is a perspective view showing the positioning and securing means for the handle bars.

An important aspect or feature of the present invention is the all mechanical securing means or arrangement.

It is, of course, to be understood that the embodiments of the invention are for the purposes of illustration only and that the scope of the invention is to be limited only by the following claims.

We claim:

1. A carrier for removably mounting at least one bicycle on an automobile comprising first and second spaced generally parallel rails, means for mounting said rails in selected positions on an automobile, a seat support bracket mounted on said first rail in a position to receive the seat of an inverted bicycle, seat clamp means for selectively positively clamping the bicycle seat on said seat support bracket, at least one handle bar clamp means adjustably mounted on said second rail, said handle bar clamp means including a lower clamp and an upper clamp member, said lower clamp member having an arcuate portion for receiving and supporting the handle bar of the bicycle, means for securing said lower clamp member in fixed adjusted position, said upper clamp member having a portion adapted to overlie the bicycle handle bar, and means for removably securing said upper clamp member in fixed position overlying the handle bar when the bicycle is in position, whereby the bicycle seat and handle bars are removably clamped to said first and second rails.

2. The structure of claim 1 in which said seat clamp means includes an elongated seat clamp, upwardly extending bolt means fixed adjacent to each end of said seat support bracket, said seat clamp having openings for receiving said bolt means, and fastener means threadedly engaging said bolt means for causing said seat clamp to engage the bicycle seat and clamp the seat onto said support bracket.

3. The structure of claim 1 in which said seat clamp means includes a pair of spaced formed metal brackets adjustably mounted on said first rail, each of said formed metal brackets adjustably supporting an inwardly extending hold down bracket, each of said hold down brackets selectively engaging the bicycle seat, means for securing said formed metal brackets to said first rail, and means for securing said hold down bracket in fixed adjusted position on said formed metal brackets, whereby said hold down brackets hold the bicycle seat on said seat support bracket.

4. The structure of claim 1 in which said seat clamp means includes a U-bolt having a pair of generally parallel arms connected by a bight portion, a protective pad mounted on said bight portion, and means for securing the ends of said arms on said seat support bracket, whereby said U-bolt engages a portion of the bicycle frame for clamping the bicycle seat onto said support bracket.

5. The structure of claim 1 including a pair of spaced handle bar clamp means disposed on opposite sides of the handle bar post.

6. The structure of claim 1 in which said handle bar clamp means is adjustable toward and from said seat support bracket to accommodate bicycles of different sizes.

7. The structure of claim 1 including protective pad means on each of said seat support bracket, seat clamp means, and said handle bar clamp means.

* * * * *